United States Patent

Gaines

[11] Patent Number: 5,052,255
[45] Date of Patent: Oct. 1, 1991

[54] SPEED BRAKE

[76] Inventor: Robert C. Gaines, 265 Leota, Union Lake, Mich. 48085

[21] Appl. No.: 364,961

[22] Filed: Jun. 12, 1989

[51] Int. Cl.⁵ .............. B23D 45/02; B23Q 15/08; B27B 5/18
[52] U.S. Cl. .............. 83/62.001; 74/411.005; 74/422; 83/74; 83/485; 83/DIG. 1; 188/184; 192/129 R
[58] Field of Search ........ 83/58, 62, 74, 76, 485, 83/571, 471.2, 471.3, 473, 486.1, DIG. 1, 483, 484, 62.1; 137/385; 251/26; 192/129 R; 74/411.5, 422, 89.17; 188/82.1, 82.7, 184; 173/4-12

[56] References Cited

U.S. PATENT DOCUMENTS

| | | | |
|---|---|---|---|
| 1,966,670 | 7/1934 | Klammer et al. | 188/82.7 |
| 2,353,088 | 7/1949 | Schutz | 83/485 |
| 3,019,823 | 2/1962 | Cornell | 83/74 |
| 3,603,360 | 9/1971 | Botefuhr | 83/486.1 |
| 3,910,142 | 10/1975 | Jureit et al. | 83/74 |
| 4,249,117 | 2/1981 | Leukhardt | 173/12 X |
| 4,448,290 | 5/1984 | Reid, Jr. et al. | 188/82.7 |
| 4,531,440 | 7/1985 | Lucky | 83/483 |
| 4,590,831 | 5/1986 | Brodin | 83/485 |
| 4,870,882 | 10/1989 | Faxon, Sr. | 83/471.3 |

*Primary Examiner*—Mark Rosenbaum
*Assistant Examiner*—Kenneth E. Peterson
*Attorney, Agent, or Firm*—Reising, Ethington, Barnard, Perry & Milton

[57] ABSTRACT

A radial arm saw assembly (10) includes a fixed position support (12) and a power saw (22) mounted on the support (12) for reciprocating movement relative thereto. The saw (22) includes a blade (28) and a drive mechanism for powering movement of the blade (28) which forces the power saw (22) towards the user (30) thereof at a predetermined speed when controlled by the user (30). A brake mechanism (38,38',38") locks movement of the saw (22) towards the user (30) when the saw (22) moves faster than the predetermined speed.

14 Claims, 5 Drawing Sheets

5,052,255

SPEED BRAKE

TECHNICAL FIELD

The present invention relates to radial arm saws of the type used for cutting wood. More specifically, the present invention relates to a safety device for use in combination with a radial arm saw for preventing inadvertent acceleration of the saw in the direction of the user.

BACKGROUND ART

Radial arm saws of the type described in the present invention generally include a track guiding a saw arm with a blade attached thereto. The blade rotates in clockwise fashion propelling the saw along the track towards the user. The saw is moved towards the user with one hand while the wood being cut is held in a fixed position with the other hand. A common hazard experienced with the radial saw is inadvertent acceleration of the saw in the direction of the user. This is due to the clockwise rotation of the blade as the saw is moved through the wood. The wood is held against a barrier referred to as fence which prevents the saw from shooting the wood off a support away from the user. Thusly, the wood being cut presents a fixed base against which the saw rotates. The rotation of the saw blade is continually forcing the saw along the saw track towards the user.

Various types of radial arm saw guards have been developed. U.S. Pat. No. 2,522,789 to Johnson, issued Sept. 19, 1950 discloses a radial arm mounting for power driven saws providing no guard. U.S. Pat. No. 3,884,101 to Silkin, issued May 20, 1975 discloses a radial arm saw guard for the exposed lower portion of the blade of the saw. U.S. Pat. No. 4,043,237 to Pyle, issued Aug. 23, 1977 discloses a transparent awareness guard in the form of a flat plate form attached to a conventional upper saw guard of a radial arm saw. U.S. Pat. No. 4,176,571 to Batson, issued Dec. 4, 1979 discloses a guard mechanism for a radial saw comprising a guard pivotally mounted to a housing for covering a front portion of the blade. U.S. Pat. No. 4,637,288 to Olsen et al, issued Jan. 20, 1987 discloses a saw apparatus including a safety device comprising means for gripping, positioning and clamping a workpiece relative to a workpiece support structure and a second normally biased off switch connected in series with a first normally biased off switch requiring both hands of an operator to be holding onto normally off switches to actuate the saw mechanism. None of the aforementioned patents provides any means for breaking the movement of a radial arm saw if the saw moves towards the user at a speed greater than a predetermined safe speed.

Various patents have issued with regard to safety brakes for saws. For example, U.S. Pat. No. 2,434,174 to Morgan, issued Jan. 6, 1948 discloses a safety brake for a bandsaw blade. The brake automatically stops and firmly holds the blade in the event that it should break or become too loose. The U.S. Pat. No. 2,500,321 to Petersen, issued Mar. 14, 1950 discloses an automatic hydraulic brake for bandsaws for instantly stopping relative motion between the tool and the work support of the machine tool upon stopping of the drive motor or breakage of the tool. Neither of these patents relate to the problems encountered in radial arm saws nor the specific problem of a radial arm saw inadvertently accelerating in the direction of the user.

U.S. Pat. No. 2,984,268 to Vuichard, issued May 16, 1961 discloses a manually actuated saw brake in combination with a radial arm saw. The brake specifically operates to quickly halt the rotation of the cutting element after deenergization of the cutting element motor. The patent does not relate to inadvertent acceleration of the saw in the direction of the user.

Other patents relate to anti-kickback devices. An example of this type of disclosure is the U.S. Pat. No. 4,212,214 to Bippus, issued Jul. 15, 1980. The Bippus patent discloses an anti-kickback device for mounting on table saws or radial arm saws that prevents the saw from throwing the board being cut back into the operator doing the feeding.

Although the aforementioned patents relate to safety devices and many relate to safety guards for radial arm saws, none of the aforementioned patents recognize the problem of inadvertent acceleration of the saw in the direction of the user and accordingly, none of the aforementioned patents disclose or even suggest a solution to the problem.

SUMMARY OF THE INVENTION

In accordance with the present invention, there is provided a radial arm saw assembly including a fixed position support and a power saw mounted on the support for reciprocating movement relative thereto. The saw includes a blade and drive means for powering movement of the blade which forces the power saw towards the user thereof at a predetermined speed when controlled by the user. The assembly includes brake means for locking movement of the saw towards the user when the saw moves faster than the predetermined speed.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
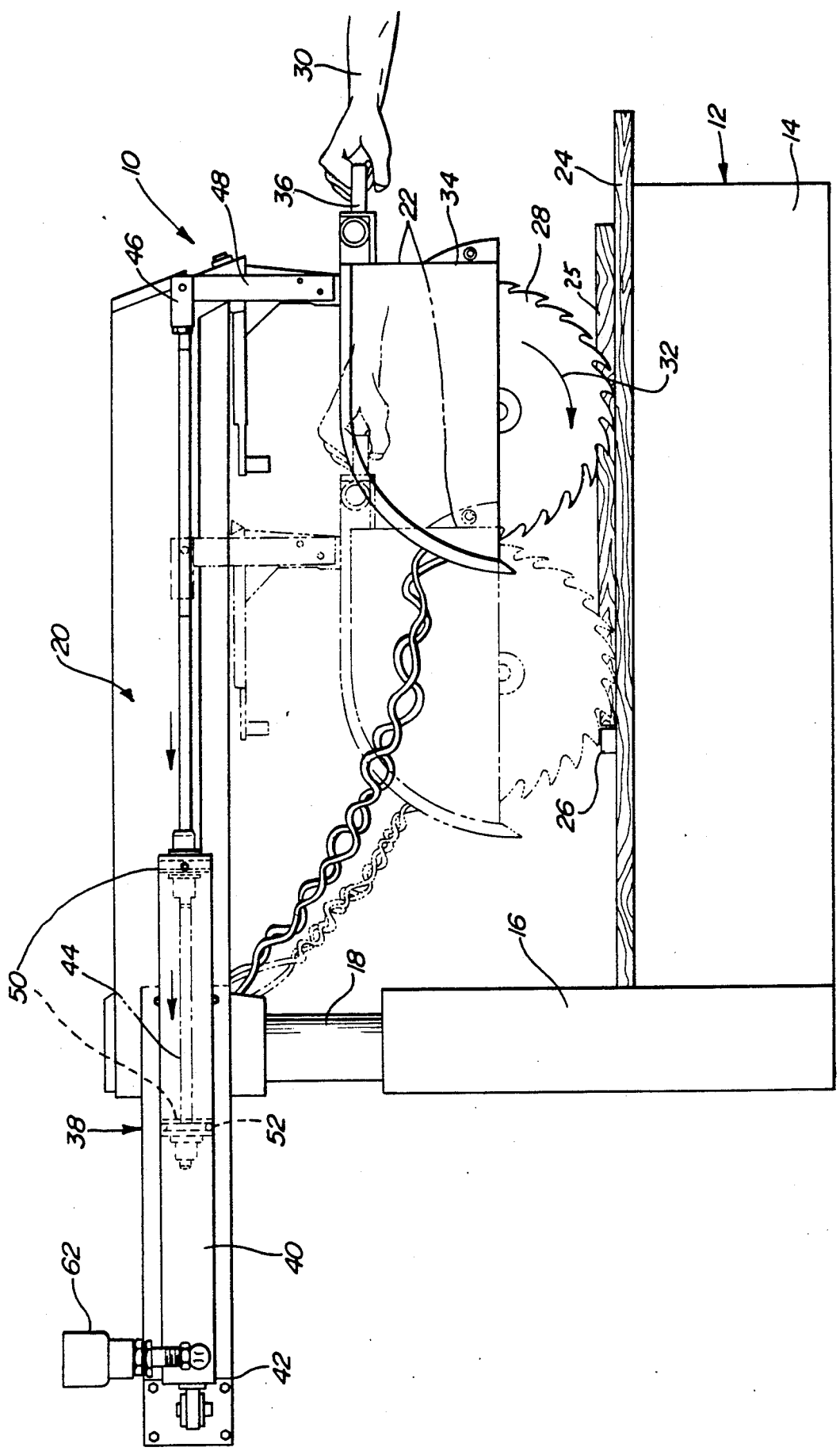
FIG. 1 is a side elevational view of a radial arm saw assembly constructed in accordance with the present invention.

A radial arm saw constructed in accordance with the present invention is generally shown at 10. Primed like numerals are used to indicate like structures between the several embodiments in the drawings.

Generally, the assembly 10 includes a fixed position support generally indicated at 12. The support 12 can include a base 14 and vertical support 16. A rod 18 is supported from the vertical support 16 for rotational movement. The rod 18 may also extend and retract vertically relative to the base 14. A track assembly generally indicated at 20 extends from the rod 18 and is moveable therewith so as to pivot in relation to the base 14 and vertical support 16. Thusly, a radial arm saw 22 supported therefrom can be adjusted so as to make various miter cross cuts in relation to a support surface board 24 the base 14. A fence 26 provides a stop for preventing the rotating blade 28 of the saw 22 from forcing a piece of wood 25 being cut away from the user. The user's arm is indicated at 30.

The power saw 22 is mounted on the support track 20 for reciprocating movement relative thereto as shown by the hatched lines in FIG. 1. The saw 22 includes the blade 28 mounted thereon for rotational movement as indicated by the arrow 32. A drive motor is contained within the housing 34 of the saw 22 for powering movement of the blade 28 which forces the power saw 22 towards the user 30 thereof at a predetermined speed when controlled by the user 30. Control is achieved by the user's hand maintaining a grip on a handle 36 of the power saw 22.

In use, the power saw 22 is moved from a neutral position shown by the hatch lines towards the user 30 to the position shown in the solid lines at 22. The clockwise rotation of the blade 28 as shown by arrow 32 forces the power saw 22 towards the user as it cuts through the wood 24.

As the saw 22 is actuated by its drive means and controlled by the user 30 maintaining a grip on the handle 36, the saw 22 is drawn towards the user at a controlled predetermined speed. Should the user 30 release the grip of the handle 36 while the saw 22 is actuated, a common hazard is experienced wherein inadvertent acceleration of the saw 22 occurs in the direction of the user 30 as the blade 28 grips the wood 25 and the saw 22 is thereby freely propelled towards the user 30. The speed at which the saw 22 is self-propelled towards the user is much greater than the predetermined speed of the saw 22 as controlled by the user 30. This inadvertent acceleration can be quite hazardous to the user 30.

The present invention provides brake means generally indicated at 38 for locking movement of the saw 22 towards the user 30 when the saw 22 moves faster than the predetermined safe speed. Thusly, the brake means 38 constructed in accordance with the present invention is actuated during inadvertent acceleration to lock the saw 22 from movement towards the user 30 thereby preventing the inadvertent acceleration of the saw 22 towards the user as the acceleration initially occurs. It is the initiation of the inadvertent acceleration which actuates the brake means 38 thereby locking the saw 22 from movement towards the user 30.

Figure 2:
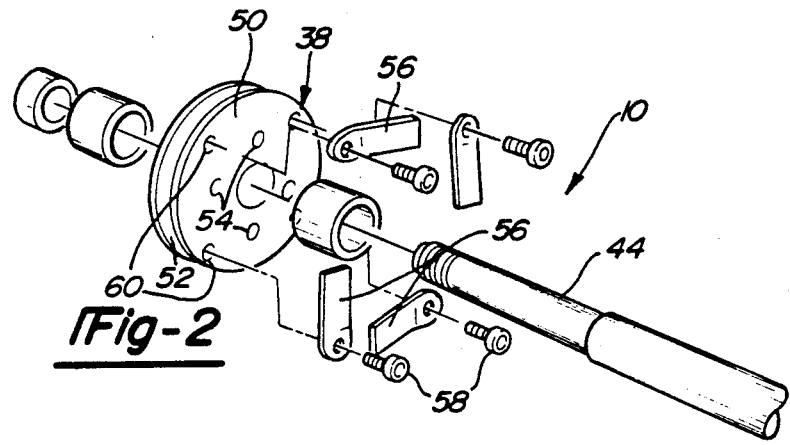
FIG. 2 is an exploded perspective view of brake assembly constructed in accordance with the present invention.
Figure 3:
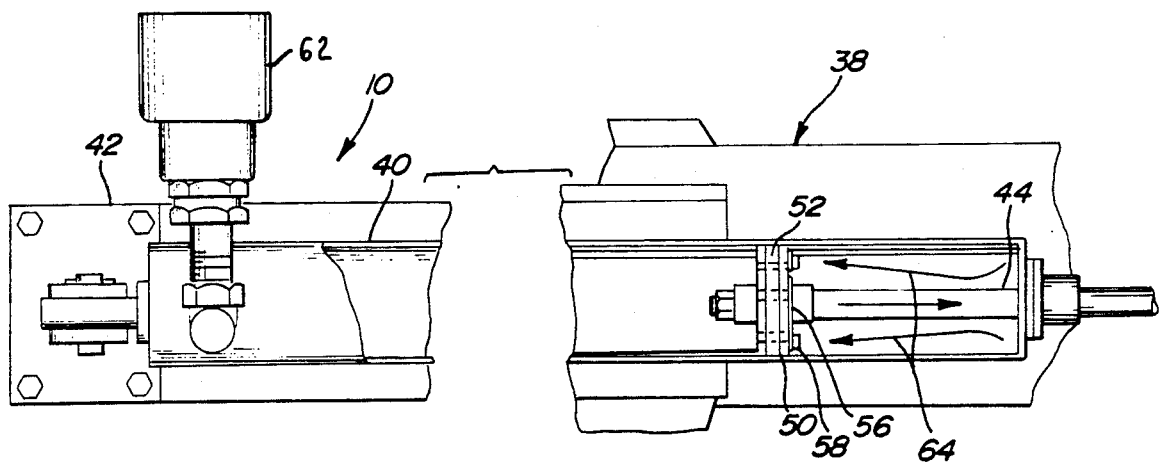
FIG. 3 is a fragmentary side elevational view partially broken away of the subject brake assembly wherein a power saw connected thereto is moving towards the user at speed greater than the predetermined speed.
Figure 4:
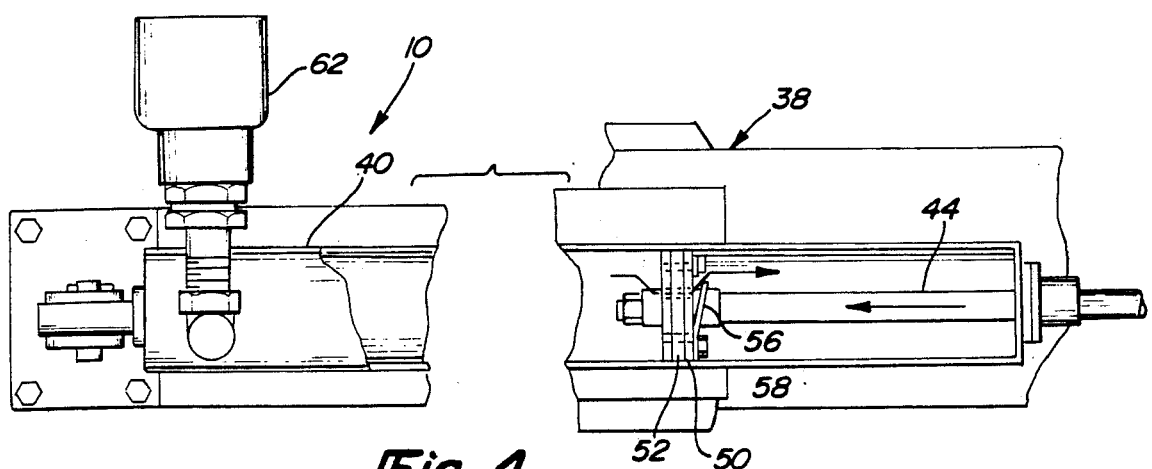
FIG. 4 is a fragmentary side view partially broken away of the subject brake assembly wherein the power saw connected thereto is being moved away from the user.

A first embodiment of the brake means 38 constructed in accordance with the present invention is more specifically shown in FIGS. 2-4. The brake assembly 38 generally includes a fixed member 40 which is in the form of a hydraulic cylinder assembly 40. The fixed member 40 includes a mounting mechanism 42 for mounting the fixed cylinder member 40 on the track housing 20 of the fixed position support 12. The brake assembly 38 further includes a moveable member in the form of a piston rod 44 which is operatively connected to the fixed cylinder member 40 to be moveable relative thereto at a predetermined speed when controlled by the user 30 as the radial saw 22 is moved towards or away from the user 30 thereof. The rod member 44 includes means for connecting the rod member 44 to the radial saw 22.

More specifically, the connecting means in the first embodiment includes a pair of interconnected brackets 46,48. Bracket 46 provides an adaptor for connection to the end of the rod 44 and bracket 48 is fixedly connected to the housing 34 of the power saw 22. The brackets 46,48 are interconnected to join the road 44 to the housing 34.

The brake assembly 38 includes speed sensitive locking means for locking the moveable rod member 44 from movement towards the user 30 relative to the fixed cylinder member 40 when the moveable rod member 44 moves faster than the predetermined speed.

The rod member 44 is operatively connected to the cylinder 40 for axial extension and retraction relative thereto. A piston 50 is mounted on the rod 44 for sliding movement within the cylinder 40. The piston 50 includes sealing means known in the art, such as O-rings, or seals having a U-shaped cross section for perfecting a sealing engagement about the piston 50 with the surrounding inner surface of the cylinder 40.

The piston 50 includes a plurality of openings 54 extending therethrough substantially parallel to the axis defined by the rod 44. The locking means of the present invention includes pressure sensitive spring valve members 56 mounted by screws 58 on the piston 50 for closing off the openings 54 to fluid flow, as shown in FIG. 3, when the piston 50 moves through the cylinder 40 at a speed greater than the predetermined speed, and being biased away from the openings 54 when the piston 50 is either moved under a controlled speed by the user or is retracted away from the user as shown in FIG. 4. The pressure sensitive valve means includes a plurality of leaf springs 56 connected to the piston 50 by the screws 58 into openings 60. The assembly includes a leaf spring 56 associated with each of the openings 54. The leaf spring 56 is mounted for pivotal movement for closing over the associated opening 54 upon the application of fluid pressure thereto associated with the movement of the piston 50 at a speed greater than the predetermined speed. This pressure is applied by fluid contained within the cylinder 40 supplied from a fluid source indicated at 62.

In operation, normal reciprocating movement of the power saw 22 by the operator 30 gripping the handle 36 does not close the leaf spring 56 so that the leaf spring 56 is maintained in the position shown in FIG. 4. Should the user 30 release the grip on the handle 36 such that the saw 22 inadvertently accelerates towards the user 30 at a speed greater than the predetermined safe speed as controlled by the user, then the fluid within the cylinder 40 causes a force indicated by arrows 64 in FIG. 3 such that the leaf spring 56 is forced to close over the its associated hole 54, as shown in FIG. 3. Thus, the present invention provides break means for locking movement of the saw 22 towards the user 30 when the saw 22 moves faster than the predetermined safe speed.

Figure 5:
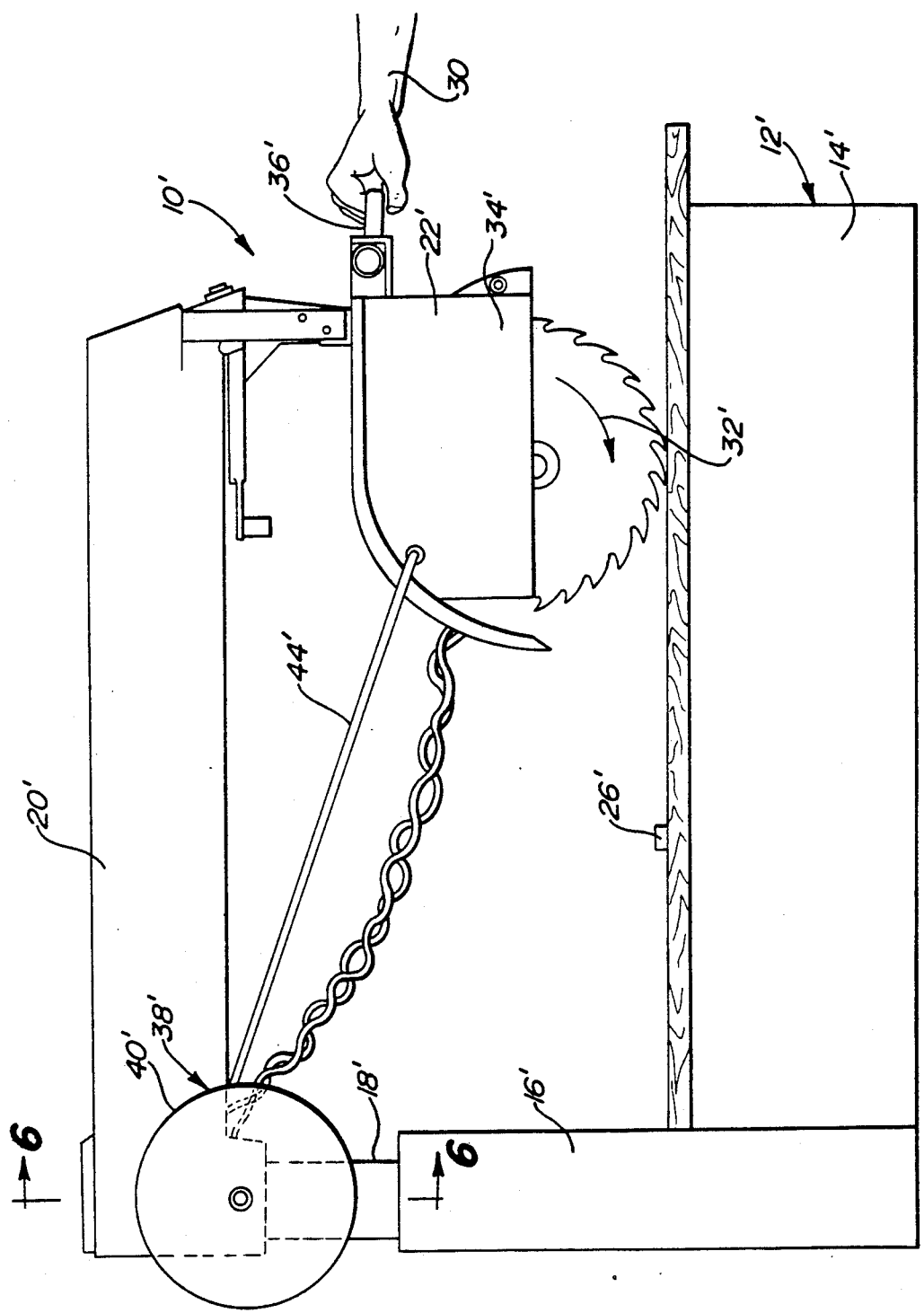
FIG. 5 is a side elevational view of a second embodiment of the present invention.
Figure 7:
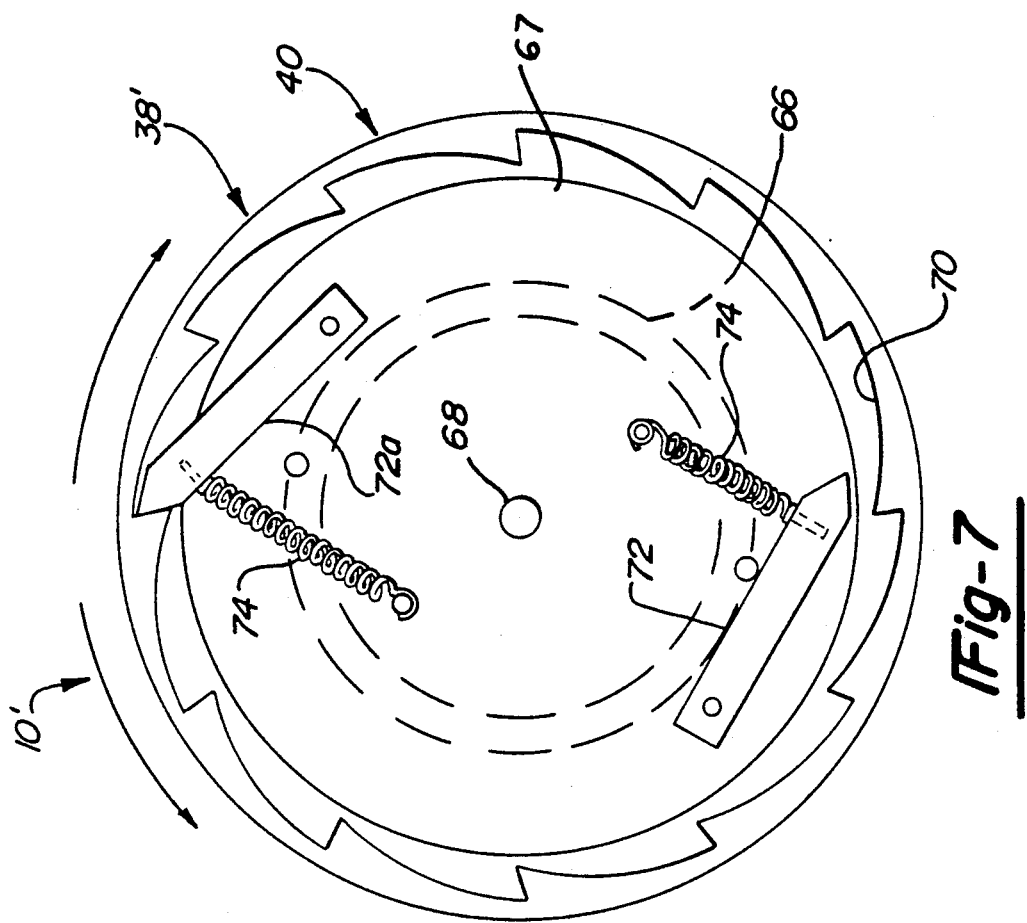
FIG. 7 is a cross sectional view taken substantially along lines 7—7 of FIG. 6.
Figure 6:
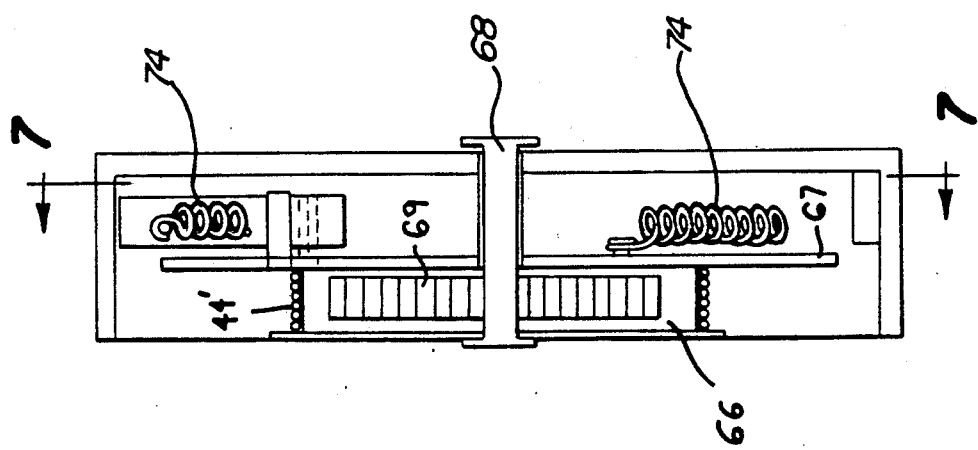
FIG. 6 is a cross sectional view taken substantially along lines 6—6 of FIG. 5.

A second embodiment of the inventive brake assembly is shown at 38' in FIGS. 5-7. The fixed member 40' is a reel housing 40' containing a reel 66 therein. The reel 66 is mounted on an axle 68 for rotation thereabout. The housing 40' is fixedly mounted on the track housing 20'.

The moveable member 44' is a cord 44' wound about the reel 66 and extending from the housing 40'. The reel 66 is biased relative to the housing 40' by means known in the art for biasing such wheels for automatically biasing the cord 44' to be wound over the reel 66. Such mechanisms are found in clothesline reels which automatically retract the clothesline back into a reel housing.

The locking means of this embodiment includes a ratcheted inner annular surface 70 of the housing 40' and at least one centrifugally driven locking member 72 mounted on an outer surface of the reel 66 for engaging the ratchet surface 70 when the reel 66 spins as the cord 44' extends at a speed greater than the predetermined speed.

The reel 66 has axis of rotation defined by the pin 68. The centrifugally driven locking member 72 is a latch member 72 connected a plate 67 mounted on the reel 66. The latch member 72 is mounted for pivoting movement radially away from the axis of rotation defined by the axle 68 as the reel 66 spins about the axis of rotation. Biasing springs 74 bias the latch member 72 towards the axis of rotation whereby the centrifugal force applied to the latch member 72 as the cable 44' is wound from the reel 66 at a speed greater than the predetermined speed overcomes the biasing force of the spring 74 so as to engage a ratchet as shown at 72a in FIG. 7 thereby locking rotation of the reel 66. Locking rotation of the reel 66 prevents further extension of the cord 44' therefrom. The cord 44' is connected to the housing 34 of the saw 22 as shown in FIG. 5. Thusly, when the reel 66 spins as the cord 44' extends at a speed greater than the predetermined speed, the locking means prevents further movement of the saw 22.

In operation, when the cable 44' is pulled off of the spool 66, the plate 67 rotates therewith. When the cable velocity reaches a pre-established speed, centrifugal force causes latch member 72 to engage the ratchet of the inner surface 70 of the housing 40' preventing further cable travel, as shown at 72a. When pressure on the cable 44' is released and the spool is allowed to return, the spring 74 allows the latch member 72 to be returned to its normal position, as shown at 72 in FIG. 7. After completion of the process the cable 44' is automatically returned to the spool 40' by a biasing mechanism such as a helically wound spring schematically shown at 69. Normal operation allows the cable 44' to travel in and out of the housing 40' against the spring tension provided by spring 69. Lock-up speed can be easily adjusted by replacing springs 74 with a spring of a different tension value.

Figure 8:
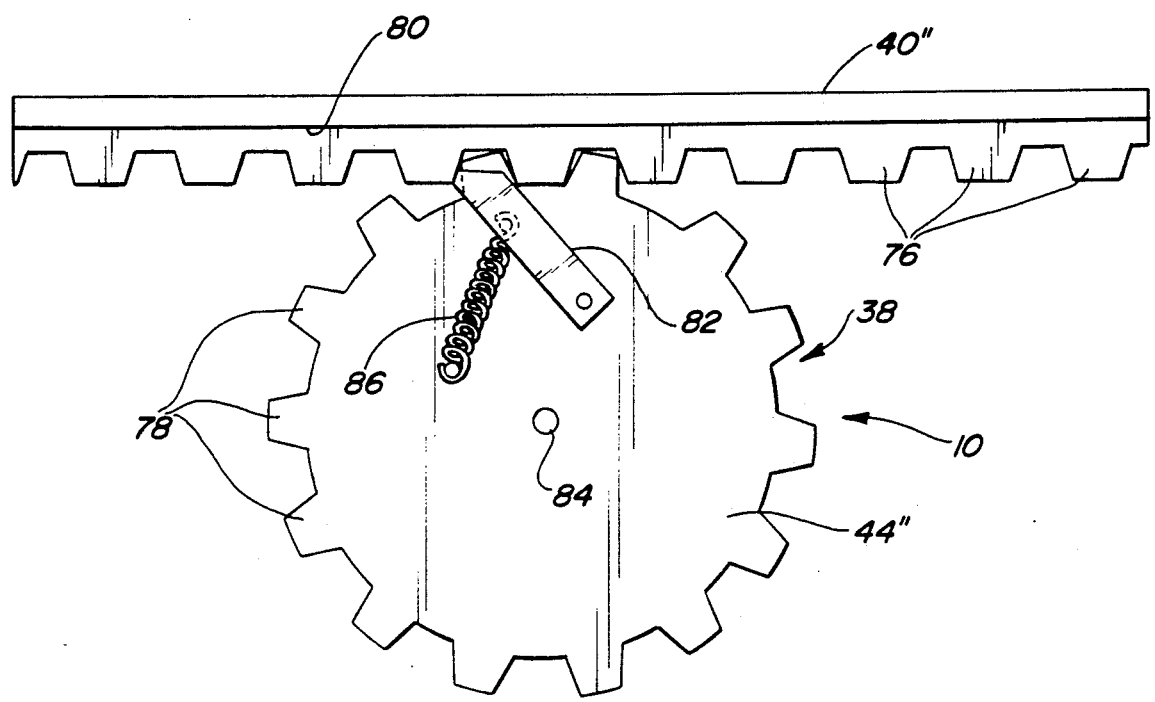
FIG. 8 is a side elevational view of a third embodiment of a brake assembly constructed in accordance with the present invention.

A third embodiment of the brake assembly is shown at 38" in FIG. 8. The fixed member 40" comprises a rack 40" having a plurality of teeth 76 extending substantially along the length thereof. Similar to the other embodiments discussed above, the rack 40" includes means for mounting itself onto the housing of the saw track 20. Thus, the rack 40" is fixedly mounted in relation to the moving saw 22.

The moveable member 44" comprises a pinion gear 44" including an outer radial surface having a plurality of teeth 78 therealong. The teeth 78 are in meshing engagement with the teeth 76 of the rack 40". The locking means includes a ratcheted surface 80 adjacent to the teeth 76 of the rack 40". The locking mechanism further includes at least one centrifugally driven locking member 82 mounted on the pinion gear 44". The pinion gear 44" is mounted on the saw housing 22 so as to be moveable therewith and rotatable relative to the rack 40". The locking member 82 engages the ratchet surface 80 when the pinion gear 44" spins as the pinion gear 44" moves relative to the rack 40" at a speed greater than the predetermined speed.

More specifically, the pinion gear 44" has an axis of rotation 84 defined by an axle 84 on which the pinion gear 44" is mounted for rotation. The centrifugally driven locking member 82 includes at lease one latch member 82 connected to the pinion gear 44" for pivoting movement radially away from the axis of rotation 84 as the pinion 44" spins about the axis of rotation 84. A biasing spring 86 biases the latch member 82 towards the axis of rotation 84. Centrifugal force applied to the latch member 82 overcomes the biasing force of the spring 86 when the pinion gear 44" spins as the pinion gear 44" moves relative to the rack 40" at a speed greater than the predetermined safe speed. Since the pinion gear 44" moves relative to the rack 40" at the speed of the moving saw housing 34, and the biasing spring 86 is set to be overcome by the centrifugal force on the latch member 82 when the pinion gear moves at speed greater than the predetermined speed, the assembly will lock if the user 30 releases the handle 36 thus allowing the saw 22 to move at a speed greater than the predetermined speed.

Figure 9:
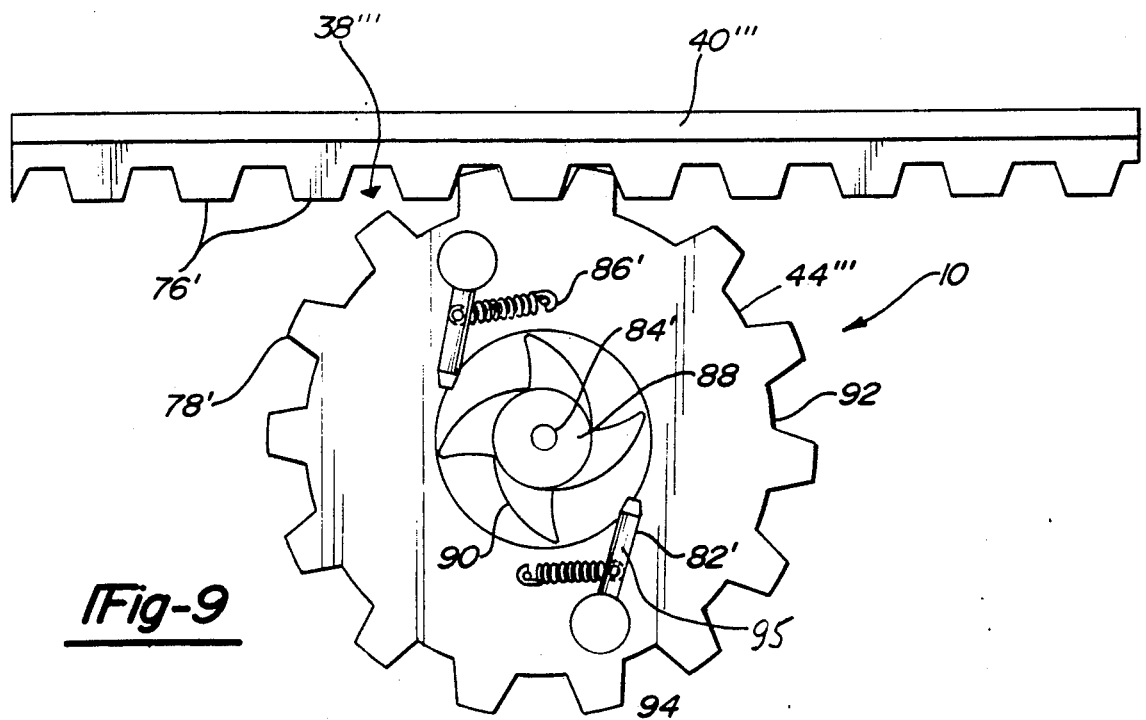
FIG. 9 is a side elevational view of a fourth embodiment of a brake assembly constructed in accordance with the present invention.

A fourth embodiment of the brake assembly is shown at 38'" in FIG. 9. The fixed member of the brake assembly includes a rack 40'" having a plurality of teeth 76' extending substantially along a length thereof. The rack is suitably secured to the track 20. The moveable member of the brake assembly 38'" includes a pinion gear 44'" suitably connected to the saw housing 34 through a stationary axle 68'. The pinion gear 44'" has an outer radial surface having a plurality of teeth 78' thereon in meshing engagement with the teeth 76' of the rack 40'". The locking mechanism includes a fixed hub member 88 mounted adjacent the pinion gear 44'". The hub member has a ratcheted radially outer surface 90. The locking mechanism further includes at least centrifugally driven locking member 82' mounted on the pinion gear 44'" for pivoting about pivotal connection 93 and engaging the ratchet surface 80' when the pinion gear 44'" spins as the pinion gear 44'" moves relative to the rack 40'" at a speed greater than the predetermined speed. Alternatively, an outer plate 92 can be connected to the pinion gear 44'", the latch members 82' being mounted thereon.

More specifically, the pinion gear 44'" has an axis of rotation defined by the axle 84'. The centrifugally driven locking member 82' includes at least one latch member 82' connected to the pinion gear 44'" for pivoting movement radially towards the axis of rotation 84' and a biasing spring 86' for biasing the latch member 82' away from the axis of rotation 84'. The latch member 82' includes a weighted end portion 94 for reacting to centrifugal force applied to the latch member 82' to overcome the biasing force of the biasing spring 86' when the pinion gear 44''' spins as the pinion gear 44''' moves relative to the rack 40''' at a speed greater than the predetermined speed.

All four embodiments of the present invention are useful in preventing the above described kickback in a radial arm saw. The invention can be further used as a safety device in combination with any machine, tool, or device where excessive velocity of movement is not safe or desired and should be stopped.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A radial arm saw assembly (10) comprising: a fixed position support (12); a power saw (22) mounted on said support (12) for reciprocating movement relative thereto, said saw (22) including a blade (20) and drive means for powering rotation of said blade (28) which forces said power saw (22) away from said support (12); characterized by brake means (38,38',38'') for locking movement of said saw (22) driven by itself away from said support (12) when said saw (22) movement reaches a predetermined speed.

2. An assembly as set forth in claim 1 further characterized by said brake means (38,38',38'') including a fixed member having first mounting means for mounting said fixed member (40) on said fixed position support (12); a moveable member (44,44',44'') operably connected to said fixed position support (12) moveable relative thereto at a predetermined speed when controlled by the user as said saw (22) is moved towards or away from said fixed member (40,40',40'') and including connecting means for connecting said moveable member (44,44',44'') to said saw (22); and speed sensitive locking means for locking said moveable member (44,44',44'') from movement towards user (30) relative to said fixed member (40,40',40'') when said moveable member (44,44',44'') is driven by said saw to move faster than the predetermined speed.

3. An assembly as set forth in claim 2 further characterized by said fixed member including a cylinder (40), said moveable member including a rod (44) operably connected to said cylinder (40) for axial extension and retraction relative thereto and a piston (50) mounted on said rod (44) for sliding movement within said cylinder (40) and sealing engagement therewith and including a plurality of openings (54) extending therethrough, said locking means including pressure sensitive valve means (56) mounted on said piston (50) for closing off said openings (54) to fluid flow when said piston (50) moves through said cylinder (40) at a speed greater than the predetermined speed.

4. An assembly as set forth in claim 3 further characterized by said pressure sensitive valve means including a leaf spring (56) connected to said piston (50) and associated with each of said openings (50), said leaf spring (56) being pivotally mounted for closing over said openings (54) upon the application of fluid pressure thereto associated with movement of said piston (50) at a speed greater than said predetermined speed.

5. An assembly as set forth in claim 1 further characterized by said fixed member including a reel housing (40)' and a reel (66) contained therein, said moveable member (44') including a cord (44') wound on said reel (66) and extending from said housing (40') said reel (66) being biased relative to said housing (40') for automatically biasing said cord (44') to be wound over said reel (66), said locking means including a ratchet inner annular surface (70) of said housing (40') and at least one centrifugally driven locking member (72) mounted on said reel (66) for engaging said ratchet surface (70) when said reel (66) spins as said cord (44') extends at a speed greater than the predetermined speed.

6. An assembly as set forth in claim 5 further characterized by said reel (66) having an axis of rotation, said centrifugally driven locking member including at least one latch member (72) connected to said reel (66) for pivoting movement radially away from said axis of rotation as said reel (66) spins about said axis of rotation and biasing means for biasing said latch member (72) towards said axis of rotation, whereby the centrifugal force applied to said latch member (72) overcomes the biasing force of said biasing means (74) when said reel 66 spins as said cord (44') extends at a speed grater than the predetermined speed.

7. An assembly as set forth in claim 1 further characterized by said fixed member including a rack (40'') having a plurality of teeth (76) extending substantially along a length thereof, said moveable member including a pinion gear (44'') including an outer radial surface having teeth (78) thereon in meshing engagement with said teeth (76) of said rack (40''), said locking means including a ratchet surface adjacent to said teeth (76) of said rack (40'') and at least one centrifugally driven locking member (82) mounted on said pinion (44'') for engaging said ratchet surface (80) when said pinion (44'') spins as said pinion (44'') moves relative to said rack (40'') at a speed greater than the predetermined speed.

8. An assembly as set forth in claim 7 further characterized by said pinion (44'') having an axis of rotation (84), said centrifugally driven locking member (82) including at least one latch member (82) connected to said pinion (44'') for pivoting movement radially away from said axis of rotation (84) as said pinion (44'') spins about said axis of rotation (84) and biasing means (86) for biasing said latch member (82) towards said axis of rotation (84) whereby the centrifugal force applied to said latch member (82) overcomes the biasing force of said biasing means (86) when said pinion (44'') spins as said pinion (44'') moves relative to said rack (40'') at a speed greater than the predetermined speed.

9. A brake assembly (38) for preventing inadvertent movement of a tool (22) relative to a fixed position support (12) thereof towards the user (30) thereof by the tool itself, said brake assembly (38) comprising: a fixed member (40) including first mounting means for mounting said fixed member (40) on the mounting said fixed member (40) on the fixed position support (12); a moveable member (44) operatively connected to said fixed member (40) to be moveable relative thereto as the tool (22) drives itself relative to the fixed member (40) or is moved towards the fixed member and including connecting means for connecting said moveable member (44) from movement towards the use (30) driven by the tool relative to said fixed member (40) when said moveable member (44) moves at a predetermined speed, said fixed member including a cylinder (40), said moveable member including a rod (44) operably connected to said cylinder (40) for axial extension and retraction relative thereto and a piston (50) mounted on said rod (44) for sliding movement within said cylinder (40) in sealing engagement therewith and including a plurality of openings (54) extending therethrough, said locking means including pressure sensitive valve means (56) mounted on said piston (50) for closing off said openings (54) to fluid flow when said piston (50) moves through said cylinder (50) at a speed greater than the predetermined speed.

10. An assembly as set forth in claim 9 further characterized by said pressure sensitive valve means including a leaf spring (56) connected to said piston (50) and associated with each of said openings (50), said leaf spring (56) being pivotally mounted for closing over said openings (54) upon the application of fluid pressure thereto associated with movement of said piston (50) at a speed greater than the predetermined speed.

11. A brake assembly (38) for preventing inadvertent movement of a tool (22) relative to a fixed position support (12) thereof towards a user (30) thereof by the tool itself, said brake assembly (38''') comprising: a fixed member (40''') including first mounting means for mounting said fixed member (40''') on the fixed position support (12); a moveable member (44''') operatively connected to said fixed member (40) to be moveable relative thereto as the tool (22) drives itself relative to the fixed member (40''') or is moved towards the fixed member and including connecting means for connecting said moveable member (44''') from movement towards the user (30) driven by the tool relative to said fixed member (40''') when said moveable member (44''') moves at a predetermined speed, said fixed member including a rack (40'') having a plurality of teeth (76) extending substantially along a length thereof, said moveable member including a pinion gear (44'') having an outer radial surface having teeth (78) thereon in meshing engagement with said teeth (76) of said rack (40''), said locking means including a ratchet surface adjacent to said teeth (76) of said rack (40'') and at least one centrifugally driven locking member (82) mounted on said pinion (44'') for engaging said ratchet surface (80) when said pinion (44'') spins as said pinion (44'') moves relative to said rack (40'') at a speed greater than the predetermined speed.

12. An assembly as set forth in claim 11 further characterized by said pinion (44'') having an axis of rotation (84), said centrifugally driven locking member (82) including at least one latch member (82) connected to said pinion (44'') for pivoting movement radially away from said axis of rotation (84) as said pinion (44'') spins about said axis of rotation (84) and biasing means (86) for biasing said latch member (82) towards said axis of rotation (84) whereby the centrifugal force applied to said latch member (82) overcomes the biasing force of said biasing means (86) when said pinion (44'') spins as said pinion (44'') moves relative to said rack (40'') at a speed greater than the predetermined speed.

13. A brake assembly (38''') for preventing inadvertent movement of a tool (22) relative to a fixed position support (12) thereof towards a user (30) thereof, said brake assembly (38''') comprising: a fixed member (40''') including a first mounting means for mounting said fixed member (40''') on the fixed position support (12); a moveable member (44''') operatively connected to said fixed member (40''') to be moveable relative thereto as the tool (22) is moved towards or away from fixed member (40''') and including connecting means for connecting said moveable member (44''') to the tool (22); and speed sensitive locking means for locking said moveable member (44''') from movement relative to said fixed member (40''') when said moveable member (44''') moves at a predetermined speed, said fixed member including a rack (40''') having a plurality of teeth (76') extending substantially along a length thereof, said moveable member including a pinion gear (44''') having an outer radial surface having teeth (78') thereon in meshing engagement with said teeth (76') of said rack (40''), said locking means including a fixed hub member (88) mounted adjacent to said pinion gear (44''') and including a ratcheted radially outer surface (90), said locking means further including at least one centrifugally driven locking member (82') mounted on said pinion gear (44''') for engaging said ratchet surface (80') when said pinion gear (44''') spins as said pinion gear (44''') moves relative to said rack (40''') at said predetermined speed.

14. An assembly as set forth in claim 16 further characterized by said pinion gear (44''') having an axis of rotation (84'), said centrifugally driven locking member (82') including at least one latch member (82') connected to said pinion gear (44''') for pivoting movement radially towards said axis of rotation (84') and biasing means (86') for biasing said latch member (82') away from said axis of rotation (84') and weight means (94') on said latch member for reacting to centrifugal force applied to said latch member (82') to overcome the biasing force of said biasing means (86'') when said pinion gear (44''') spins as said pinion gear (44''') moves relative to said rack (40''') at a speed greater than the predetermined speed.

* * * * *